United States Patent [19]

Patricca et al.

[11] 4,414,068

[45] Nov. 8, 1983

[54] SELF-CURABLE RESINOUS COMPOSITIONS USEFUL IN COATING APPLICATIONS

[75] Inventors: Steven E. Patricca, Pittsburgh; Stephen L. Buchwalter, Allison Park, both of Pa.

[73] Assignee: PPG Industries, Inc., Pittsburgh, Pa.

[21] Appl. No.: 357,025

[22] Filed: Mar. 11, 1982

Related U.S. Application Data

[62] Division of Ser. No. 175,163, Aug. 4, 1980, Pat. No. 4,341,676.

[51] Int. Cl.$^3$ .............................................. C25D 13/06
[52] U.S. Cl. ............................... 204/181 C; 523/417; 524/512; 524/535; 524/538; 524/901
[58] Field of Search ............... 204/181 C; 524/901, 524/535, 538, 512; 523/417; 525/157

[56] References Cited

U.S. PATENT DOCUMENTS

| | | | |
|---|---|---|---|
| 3,758,429 | 9/1973 | Fallwell, Jr. | 260/37.4 SP |
| 3,799,854 | 3/1974 | Jerabek | 204/181 |
| 3,821,175 | 6/1974 | Daniels et al. | 260/80.73 |
| 3,853,803 | 12/1974 | Anderson et al. | 260/29.6 TA |
| 3,953,391 | 4/1976 | Dowbenko et al. | 260/29.6 TA |
| 3,976,615 | 8/1976 | Sekmakas | 260/29.6 HN |
| 4,001,160 | 1/1977 | Lindemann | 260/29.6 WA |
| 4,012,353 | 3/1977 | Chasin et al. | 260/29.6 NR |
| 4,017,438 | 4/1977 | Jerabek et al. | 260/29.2 EP |
| 4,021,397 | 5/1977 | Shah | 260/29.6 N |
| 4,035,272 | 7/1977 | McGinniss | 204/181 |
| 4,037,018 | 7/1977 | McGinniss | 428/418 |
| 4,057,527 | 11/1977 | Columbus | 260/29.6 WB |
| 4,059,665 | 11/1977 | Kelley | 264/128 |
| 4,076,928 | 2/1978 | Gross | 526/240 |
| 4,079,029 | 3/1978 | Gross | 260/29.6 TA |
| 4,116,900 | 9/1978 | Belanger | 260/18 EP |
| 4,129,610 | 12/1978 | Kobayashi et al. | 260/837 R |
| 4,138,541 | 2/1979 | Cenci et al. | 526/303 |
| 4,148,772 | 4/1979 | Marchetti et al. | 260/29.2 EP |
| 4,170,582 | 10/1979 | Mori et al. | 260/29.6 RW |
| 4,176,103 | 11/1979 | Cruden et al. | 260/29.6 RW |
| 4,260,720 | 4/1981 | Bosso et al. | 528/109 |

Primary Examiner—Theodore E. Pertilla
Attorney, Agent, or Firm—Godfried R. Akorli

[57] ABSTRACT

The present invention relates to N-methylol amide-containing resinous compositions and the methods of preparing them. Aqueous dispersions of the instant resinous composition containing N-methylol amides in amounts sufficient to impart self-curing at comparatively low temperatures are disclosed. The aqueous dispersions of the instant resinous compositions are useful as coating compositions; they are particularly suited to electrodeposition.

15 Claims, No Drawings

SELF-CURABLE RESINOUS COMPOSITIONS USEFUL IN COATING APPLICATIONS

This is a division of application Ser. No. 175,163 filed Aug. 4, 1980 now U.S. Pat. No. 4,341,676 issued July 27, 1982.

BACKGROUND OF THE INVENTION

1. Field of the Invention

The present invention relates to resinous coating compositions which contain N-methylol amide groups.

2. Description of the Prior Art

Resinous materials comprising various forms of N-methylol groups such as etherified N-methylol groups are known as being useful in enhancing cure properties of coating compositions. Although coating compositions containing free N-methylol groups are highly reactive and well suited to enhance curing properties, they are not favored because of their high reactivity and particular susceptibility to condensation reaction with themselves and with other sources of active hydrogens. Consequently, resinous materials and for that matter coating compositions containing free N-methylol groups, in amounts sufficient to effect good cure have been difficult to prepare and handle. When used in amounts sufficient to impart good cure properties, the resinous materials comprising free N-methylol groups can gel prematurely and become ineffective as coating compositions.

In consideration of the foregoing, the art has stayed clear of using free N-methylol groups in amounts which will otherwise cure very well. Instead, the N-methylol groups are either used in forms that are less reactive, e.g., in etherified forms, or in amounts which are not sufficient to effectively enhance cure properties.

The present invention, in contrast, provides stable aqueous resinous compositions containing free N-methylol groups in the form of N-methylol amide in amounts sufficient to impart excellent cure properties at comparatively low temperatures.

SUMMARY OF THE INVENTION

The present invention encompasses an aqueous resinous composition containing a polymer characterized by the pendant group which is of the structure:

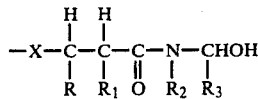

wherein X represents sulfur, or an amino group

of which R' is hydrogen or a hydrocarbyl group, preferably an alkyl group, containing from about 1 to 6 carbon atoms; and wherein R, $R_1$, $R_2$ and $R_3$, each independently, is hydrogen or hydrocarbyl group, preferably an alkyl group, containing from about 1 to 6 carbon atoms. More preferably, the alkyl groups contain from about 1 to 4 carbon atoms. Most preferably, R', R, $R_1$, $R_2$ and $R_3$, each independently, is hydrogen or methyl.

The instant aqueous resinous compositions may also comprise water-solubilizing groups.

The term "pendant group" as used herein is intended to include terminal groups as well as pendant groups which are not in terminal position. In the representative structure afore-described, the open valence is satisfied by connecting it to a carbon which is a member of the polymer backbone or a carbon which is a member of the polymer side chain.

In the present invention, aqueous resinous compositions containing cationic base groups, particularly those having pH of 4 or greater are preferred.

The present invention, further, encompasses the process of preparing the aqueous resinous composition; said process comprising reacting a polymer containing a pendant mercapto group, and/or a pendant amino group which is a primary and/or secondary amine, or a mixture thereof, in an aqueous medium with an N-methylol ethylenically unsaturated amide of the structure:

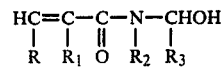

wherein R, $R_1$, $R_2$ and $R_3$, each independently, is a hydrogen or hydrocarbyl group, preferably an alkyl group, containing from about 1 to 6 carbon atoms. More preferably, the alkyl group contains from about 1 to 4 carbon atoms. Most preferably, R, $R_1$, $R_2$ and $R_3$, each independently, is hydrogen or methyl.

By this invention, aqueous resinous compositions containing N-methylol amide groups in amounts sufficient to provide self-curing resins can be obtained.

The instant aqueous resinous compositions containing water-solubilizing groups are stable and can be used in coating various substrates. It is noteworthy that films obtained from the aqueous compositions, particularly via cathodic electrodeposition, self-cure at low temperatures.

DETAILED DESCRIPTION

The resinous compositions of the present invention are prepared by reacting an N-methylol ethylenically unsaturated amide with a polymer which contains a mercapto, and/or a pendant amino group which is a primary and/or secondary amine, or the mixture of the aforesaid polymers.

Some examples of the polymers containing the pendant amino group are those selected from the group consisting of amide adducts of epoxy group-containing polymers which are preferred, polyamide-amine resins and amino group-containing acrylic polymers. The nature and preparation of these polymers are known in the art. For example, amine adducts of epoxy group-containing polymers are described in U.S. Pat. No. 4,116,900 to Belanger, column 3, line 46, to column 4, line 32; column 5, lines 15-25, and lines 53-62, the portions of which are herein incorporated by reference. Preferred amine adducts of epoxy group-containing polymers are those of polyepoxides with ketimines of polyalkyleneamines. These are described in U.S. Pat. No. 4,017,438 to Jerabek et al., column 3, line 49, to column 4, line 55, and column 7, line 43, to column 5, line 51, which are herein incorporated by reference. U.S. Pat. No. 4,001,156 to Bosso et al., column 3, line 59, to column 5, line 25, which is incorporated herein by reference, discloses epoxy-containing acrylic polymers and their ketimine adduct which can be useful herein.

Besides the amine adducts of the epoxy-containing polymers, examples of other polymers containing pendant amines are poly(amine-amides) including poly(amine-ester-amides) which are prepared by condensation of dicarboxylic acids, polyamines and, if desired, polyols. These polymers are described in U.S. Pat. No. 3,799,854 to Jerabek, column 3, lines 19–50, the portion of which is herein incorporated by reference.

Also, amino group-containing acrylic polymers can be used. Examples thereof include those described in U.S. Pat. No. 3,953,391 to Dowbenko et al., which is herein incorporated by reference.

Polymers containing pendant mercapto groups are also known in the art. Examples thereof include those polymers described in U.S. Pat. No. 4,035,272 to McGinniss, see column 1, line 52, to column 2, line 26, which is herein incorporated by reference.

Mixtures of the above-described polymers can also be used. It is to be noted that the use of the polymers containing mercapto groups provides a means of increasing the N-methylol group content of the instant aqueous resinous composition without increasing their amino group content. This is significant in coating compositions wherein the presence of excess amino groups can adversely affect the coat-out properties of the composition.

As stated hereinbefore, the polymers containing the pendant mercapto and/or amino group or the mixture thereof are reacted in an aqueous medium with the N-methylol ethylenically unsaturated amide. To enhance the reaction of these polymers in water, they can either be used with, or they can contain solubilizing groups, for example, a cationic group such as an amine salt, which makes them compatible with the aqueous medium.

Usually, the polymers contain amino groups which are partially neutralized with acids to form dispersions in aqueous medium; they are subsequently reacted with an N-methylol ethylenically unsaturated amide. The polymers are partially neutralized with organic or inorganic acids such as acetic and lactic acid or phosphoric acid. The extent of neutralization can be about 1 to 80, more usually 5 to 50 percent of the total theoretical neutralization.

As to the amino groups, the amount contained in the polymer can be characterized as that which is sufficient to render the resinous composition cationic, that is, transportable to the cathode when acid-solubilized.

The N-methylol ethylenically unsaturated amides which are useful herein are of the following structure:

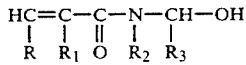

wherein R, $R_1$, $R_2$ and $R_3$, each independently, is a hydrogen or a hydrocarbyl group, preferably an alkyl group, containing from about 1 to about 6 carbon atoms. More preferably, the alkyl group contains from about 1 to 4 carbon atoms. Most preferably, R, $R_1$, $R_2$ and $R_3$, each independently, is methyl or hydrogen. Specific but non-limiting examples of the N-methylol ethylenically unsaturated amide include N-methylolacrylamide, N-methylolmethacrylamide and N-(1-hydroxyethyl)acrylamide. Typically, the N-methylol ethylenically unsaturated amide is in the form of an aqueous solution.

In the preparation of the instant aqueous resinous compositions, the N-methylol ethylenically unsaturated amide is added to the aqueous dispersion of the amino and/or mercapto group-containing polymer or the mixture thereof in an amount sufficient to provide N-methylol amide groups which impart self-curing characteristics to the polymer. Self-curing characteristics can be determined by solvent resistance of the cured coating. Coatings which can withstand at least 30 acetone double rubs are considered cured. In determining solvent resistance, a cloth is saturated with acetone and the coating rubbed back and forth (double rub) until the coating is softened or removed from the substrate. The equivalent ratio of the N-methylol ethylenically unsaturated amide to the reacting polymer containing the pendant group can be in the range of 0.1–1.0 to 1.0, preferably 0.5–1.0 to 1.0 of the N-methylol ethylenically unsaturated amide to the polymer. The equivalent ratio is determined by equivalents of unsaturation in the N-methylol ethylenically unsaturated amide to the equivalents of the pendant amino and/or mercapto groups in the polymer.

Preferably, the N-methylol amide group is present in amounts ranging from about 1 to 20 percent, more preferably from about 5 to 20 percent by weight (calculated value) as determined by the weight of N-methylol groups (—CH$_2$OH) in relation to the weight of the polymer containing pendant amino and/or mercapto groups.

The amount of water which is present during the reaction is that which is sufficient to prevent gelation. The amount of water which is used, of course, depends on the nature and the amount of the N-methylol ethylenically unsaturated amide. The weight ratio of the water to the N-methylol ethylenically unsaturated amide is at least 0.5 to 1 and preferably at least 1:1.

The temperature of the reaction can vary over the range of 20° to 100° C. and preferably 20° to 50° C. and will depend on the reactants and the desired speed of the reaction. Too high a temperature may activate the N-methylol groups and result in gelation; too low a temperature may result in extremely slow reaction or non-reaction.

The resultant aqueous resinous composition obtained from the reaction is preferably diluted with water. For reasons of stability, it is preferred that the instant aqueous resinous composition be maintained at a pH range of about 4 or greater.

While not desiring to be bound to any particular theory, it is believed that the reaction mechanism involved in the preparation of the compositions of the present invention is that of a Michael addition. The polymer, through the pendant amino or mercapto group, adds to the N-methylol ethylenically unsaturated amide at the site of unsaturation, thereby forming the compositions of the present invention.

In general, the instant resinous compositions have molecular weights within the range of about 500 to 50,000 and preferably about 1000 to 5000. The molecular weight is a calculated value based on stoichiometry, for example, condensation polymers such as polyglycidyl ethers of polyphenols. If the molecular weight cannot be readily calculated, for example, acrylic polymers, then the molecular weight is a measured value by Gel Permeation Chromatography using a polystyrene standard.

The term "dispersion" as used within the context of the present invention is believed to be a two-phase, transparent, translucent or opaque aqueous resinous system in which the resin is the dispersed phase and water is the continuous phase. Average particle size diameter of the resinous phase is generally less than 10 and preferably less than 5 microns. The concentration of the resinous phase in the aqueous medium depends upon the particular end use of the dispersion and in general is not critical. For example, the aqueous dispersion preferably contains at least 1 and usually from about 5 to 50 percent by weight resin solids.

For coating applications, the aqueous medium may contain besides water a coalescing solvent. The use of coalescing solvent may be, in some instances, for improved film appearance. These solvents include hydrocarbons, alcohols, esters, ethers and ketones. The preferred coalescing solvents include mono-alcohols, glycols and polyols as well as ketones and other alcohols. Specific coalescing solvents include isopropanol, butanol, 2-ethylhexanol, isophorone, 4-methoxy-2-pentanone, ethylene and propylene glycol, and the monoethyl, monobutyl and monohexyl ethers of ethylene glycol. The amount of coalescing solvent is not unduly critical and is generally between about 0.01 and 40 percent by weight, preferably about 0.05 to about 25 percent by weight based on total weight of aqueous medium.

In most instances, a pigment composition and, if desired, various additives such as surfactants or wetting agents are included in the dispersion. Pigment composition may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. Pigment content of the dispersion is usually expressed as pigment-to-resin ratio. In the practice of the present invention, the pigment-to-resin ratios are usually within the range of 0.1 to 5:1. The other additives mentioned above are present in the dispersion in amounts of 0.01 to 3 percent by weight based on total weight of resin solids.

Even though films obtained from the aqueous resinous compositions self-cure, it may be desirable to combine them with curing agents. When used with curing agents, it is preferred that the polymers of the instant aqueous resinous composition also contain active hydrogens which are reactive at elevated temperatures with a curing agent. Examples of active hydrogens are hydroxyl, thiol, primary amine, secondary amine (including imine) and carboxyl.

The curing agents are those which are capable of reacting with the active hydrogens to form a cross-linked product. Examples of suitable curing agents are phenolic resins, aminoplasts and polyisocyanates. The polyisocyanates should be capped or blocked so that they will not prematurely react with the active hydrogens.

Suitable aminoplasts for use in the invention are described in U.S. Pat. No. 3,937,679 to Bosso et al. in column 16, line 3, continuing to column 17, line 47, the portions of which are hereby incorporated by reference. As disclosed in the aforementioned portions of the '679 patent, the aminoplast can be used in combination with methylol phenol ethers. The aminoplast curing agent usually constitutes about 1-60 and preferably 5-40 percent by weight of the resinous composition based on total weight of the acid-solubilized resinous vehicle and the aminoplast.

With regard to the capped or blocked polyisocyanate curing agents, these are described in U.S. Pat. No. 4,104,147, column 7, line 36, continuing to column 8, line 37, the portions of which are hereby incorporated by reference. Sufficient capped or blocked polyisocyanate is present in the coating system such that the equivalent ratio of latent isocyanate groups to activate hydrogens is at least 0.1:1 and preferably about 0.3 to 1:1.

When the aqueous dispersions described above are employed for use in electrodeposition, the aqueous dispersion containing cationic groups is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The conditions under which electrodeposition is carried out are, in general, similar to those used in electrodeposition of other types of coatings. The applied voltage may be varied and can be, for example, as low as one volt or as high as 300 volts, but typically between 50 and 200 volts. The current density is usually between 1.0 ampere and 15 amperes per square foot and tends to decrease during electrodeposition indicating the formation of an insulating film.

The curable resinous compositions of the present invention can also be used in other conventional coating applications such as flow, dip, spray and roll coating applications. It is, however, desired to point out that the process of electrodeposition is better suited to the application of the aqueous dispersions of the instant resinous compositions. It has been found that films obtained from the electrodeposition of the aqueous dispersions self-cure very well and at comparatively low temperatures.

For electrodeposition and other conventional coating applications, the coating compositions can be applied to a variety of electroconductive substrates especially metals such as steel, aluminum, copper, magnesium and the like, but also including metallized plastic and conductive carbon-coated materials. For other conventional coating applications, the compositions can be applied to non-metallic substrates such as glass, wood and plastic.

After the coating has been applied by electrocoating or flow coating, it is usually cured by baking at temperatures such as 90° to 180° C. for about 1 to 30 minutes.

Further illustrating the invention are the following examples, which, however, are not to be construed as limiting the invention to their details. All parts and percentages in the examples as well as throughout this specification are by weight unless otherwise indicated.

EXAMPLE I

This example shows the reaction of an epoxy polymer with a ketimine of a polyamine followed by reacting the resulting product in aqueous medium with N-methylol ethylenically unsaturated amide to form an aqueous dispersion of the resinous composition having a pH of 8.5.

The charge for reacting the epoxy polymer with the polyamine was as follows:

| Ingredients | Parts by Weight in Grams |
|---|---|
| EPON 829[1] | 2084.5 |

| Ingredients | Parts by Weight in Grams |
| --- | --- |
| Bisphenol A | 673.0 |
| Diketimine of diethylenetriamine (73% solids in methyl isobutyl ketone solvent) | 1650.0 |
| Methyl ethyl ketone | 500.0 |

[1] Polyglycidyl ether of bisphenol A having a molecular weight of about 380 and an epoxy equivalent of about 190, which is available from Shell Chemical Company.

The EPON 829 and bisphenol A were added to a reaction vessel under a nitrogen atmosphere and heated to 150° C. to initiate an exotherm. The reaction was allowed to exotherm for about 40 minutes with the highest temperature reaching 200° C. The reaction mixture was then held at 150° C. for about 1½ hours, allowed to cool to 80° C., and diluted with methyl ethyl ketone. The reaction mixture was further allowed to cool to 63° C., whereupon the addition of the methyl isobutyl ketone containing the diketimine of diethylenetriamine was begun, and completed over a period of five minutes at about 53° C. The reaction mixture was heated up to 80° C. and held at that temperature for an hour.

The reaction mixture had an epoxy equivalent of infinity indicating that substantially all the epoxy functionality had been consumed. The resulting reaction mixture had a solids content of 78 percent.

The epoxy polymer-ketimine adduct prepared as described above was reacted with N-methylolacrylamide using the following charge:

| Ingredients | Parts by Weight in Grams |
| --- | --- |
| Epoxy polymer-amine adduct prepared as described above | 228.1 |
| Lactic acid (88% aqueous) | 14.8 |
| N—methylolacrylamide (48% aqueous) | 69.1 |
| H₂O (deionized) | 2033.0 |

The epoxy polymer-ketimine adduct was digested with the lactic acid and 100 ml. of the water at room temperature for about 30 minutes followed by a dropwise addition of the aqueous N-methylolacrylamide. Another 300 ml. of water was added followed by stirring of the reaction mixture for about one-half hour, then the remainder of the water was added. The reaction mixture was then filtered to give a stable aqueous resinous dispersion of the present invention having a pH of 8.7 and a solids content of 10 percent.

Untreated steel panels were cathodically electrocoated in the dispersion as produced in Example I. Coating at 150 volts for 90 seconds and baking at 177° C. for 30 minutes resulted in films that were hard and dark in appearance. About 50 double rubs with acetone were required to remove the film from the substrate. Film thickness was 0.5 mil.

When the dispersion was left stirring overnight, no sign of precipitation was observed, and cure response was markedly enhanced. Untreated steel panels were again electrocoated. Coating at 50 volts for 15 seconds and baking at 177° C. for 20 minutes resulted in a film with excellent solvent resistance. The film was unaffected by 100 double rubs with acetone. Film thickness was 1.5 mils. Similarly, a film coated at 150 volts for 15 seconds and baked at 121° C. for 20 minutes was unaffected by 100 double rubs with acetone.

EXAMPLE II

This example illustrates the variation of resinous materials useful in preparing the instant aqueous resinous compositions. The charge for preparing the epoxy polymer-ketimine adduct was as follows:

| Ingredients | Parts by Weight in Grams |
| --- | --- |
| EPON 1001[1] | 1395.0 |
| PCP 0200[2] | 402.6 |
| Xylene | 110.7 |
| Benzyldimethylamine | 5.1 |
| Diketimine of diethylenetriamine | 513.0 |
| Methyl ethyl ketone | 473.3 |

[1] Bisphenol A based epoxy resin, supplied by Shell Chemical Company, having a molecular weight of 952.
[2] Polycaprolactonediol, manufactured by Union Carbide Corporation.

Into a properly equipped reaction vessel was charged a melt of the EPON 1001 and the PCP 0200, in xylene. Under a nitrogen blanket, the mixture was heated to reflux. Water was removed as a xylene azeotrope over a period of 45 minutes, with the temperature rising to 208° C. A total of 12 ml. of water was removed; it was then apparent that no more water was present. Thereafter, the reaction mixture was allowed to cool to about 135° C. When a sample of the reaction mixture was reduced with an equal weight of 2-ethoxyethanol, it had a viscosity of A+ on the Gardner-Holdt scale. At 130° C., benzyldimethylamine was added to the reaction mixture which was then at this temperature for about 90 minutes. At this point, the viscosity of the mixture as determined above was E+. After another 30 minutes, the viscosity increased to H+. The mixture was immediately cooled to 119° C., followed by the addition of the diketimine. There was an exotherm with the temperature rising to 121° C. Two hours later at 110° C., methyl ethyl ketone was added dropwise to the mixture. The resultant epoxy-ketimine adduct had a solids content of 68.7 percent.

The epoxy polymer-ketimine adduct prepared as described above was reacted with aqueous N-methylolacrylamide. The following charge was used in the reaction:

| Ingredients | Parts by Weight in Grams |
| --- | --- |
| Epoxy polymer-amine adduct prepared as described above | 268.0 |
| Acetic acid | 5.0 |
| H₂O (deionized) | 239.5 |
| 48% aqueous N—methylolacrylamide | 50.9 |
| Acetic acid | 2.5 |
| H₂O (deionized) | 602.1 |

The epoxy-ketimine adduct and the first batch of acetic acid were charged to a suitable reaction vessel. The first batch of water was added dropwise, followed by the addition of the N-methylolacrylamide, very slowly. The reaction mixture was stirred for about 15 minutes followed by the addition of the second batch of acetic acid. With the remainder of the water, the reaction mixture was slowly thinned into a resultant translucent dispersion which had a pH of 8.2.

The following illustrates the stability of the aqueous resinous compositions of the instant invention. The stability was evaluated by determining whether samples of the resinous composition prepared in the manner of Example II formed any sediment after 14 days of aging.

The resinous compositions were evaluated under the following conditions: in both open and sealed containers and at ordinary room temperature, as well as hot-room temperature of 120° F. (49° C.). In open containers, the compositions were stirred continuously over the 14 days.

Dispersions of 10 and 20 percent solids content were evaluated accordingly and found to form no sediments. Dispersions of 30 percent solids were evaluated with the following results: with the exception of the sample in a sealed container stored at 120° F. (49° C.), no effect on the dispersions was observed. At 120° F. (49° C.), however, the dispersion became somewhat gummy after 14 days of aging.

The following illustrates the stability and gel-free nature of the aqueous N-methylol resinous composition at varying pH. The stability was evaluated by the method of determining whether the resinous composition formed any sediment after 14 days of aging at varying pH. A 15 percent solids sample of the resinous composition as prepared in Example II having a pH of 8.2 was used as a standard. The sample was contained in an open beaker for 14 days, after which time the pH was 6.5 and no sediment was observed. A fresh sample of the resinous composition having the pH adjusted to 6.0 with acetic acid was contained in a beaker for 14 days. Again no sediment was observed and the pH was 5.9. A third sample having the pH adjusted to 5 with acetic acid was evaluated in the same way and found to have no sediment after 14 days. The pH changed from 5 to about 5.5. The fourth sample having a pH of 4.1 was evaluated in the same way and found to have no sediment after 14 days; the pH changed from 4.1 to 4.2.

EXAMPLE III

This example illustrates the aqueous resinous compositions obtained from polymers containing both pendant amino groups and pendant mercapto groups. The charge for the preparation is as follows:

| Ingredients | Parts by Weight in Grams | Equivalents |
| --- | --- | --- |
| EPON 1001[1] | 505 | 1.00 |
| Dibenzyl ether | 91.8 | — |
| Diethylenetriamine diketimine | 235.9 | 0.65 |
| Trimethylolpropane-tris-(3-mercaptopropionate) | 146.5 | 1.05 |

[1]Polyglycidyl ether of bisphenol A having a molecular weight of about 952, supplied by Shell Chemical Company.

Melted EPON 1001 and the dibenzyl ether were mixed together and heated for 30 minutes to 123° C. The reaction mixture was allowed to cool to 110° C. whereupon diethylenetriamine diketimine and trimethylolpropanetris-(3-mercaptopropionate) were added, cooling the reaction mixture further to 82° C. There was then an exotherm with the temperature rising to 93° C. The reaction mixture was then heated to 110° C., held at this temperature for about 10 minutes and further heated to 117° C. over a period of one hour.

The reaction mixture was again allowed to cool to 105° C. over a period of about 90 minutes. The resulting product was further cooled to about 30° C. and poured out of the reaction vessel as a clear dark fluid.

Aqueous N-methylolacrylamide was reacted with the above product using the following charge:

| Ingredients | Parts by Weight in Grams |
| --- | --- |
| The above product | 213 |
| Acetic acid (30% total neutralization) | 7.5 |
| Water (deionized) | 200 |
| 48% N—methylolacrylamide (aqueous) | 118.8 |
| Water (deionized) | 1090.7 |

The above product was warmed to about 70° C. and digested with the acetic acid and the first batch of water for 30 minutes at room temperature. The aqueous N-methylolacrylamide was then added. The resulting reaction mixture was held for an hour and a half, at room temperature, after which the remainder of the water was added to thin the composition to 15 percent resin solids content.

Untreated steel substrates were cathodically electrocoated in the dispersion of Example III using 100 volts for 90 seconds at room temperature. Films having excellent appearance, insulation and substrate adhesion were obtained.

When baked at 121° C. for 20 minutes, very hard films were obtained which required 70 acetone double rubs to be removed. When baked at 107° C. for 20 minutes, hard films were obtained which required 75 acetone double rubs to be removed. When baked at 83° C. for 20 minutes, the films required 30–40 double rubs to be removed. Film thicknesses were about 0.5–0.6 mil.

While the illustrative embodiments of the invention have been described hereinabove with particularity, it will be understood that various modifications will be apparent to and can be readily made by those skilled in the art without departing from the scope or spirit of the invention. Accordingly, it is intended that claims directed to the invention be construed as encompassing all aspects of the invention which would be treated as equivalents by those skilled in the art to which the invention pertains.

We claim:

1. In an improved process for cathodically electrocoating an electrically conductive surface serving as a cathode which comprises passing an electric current between said cathode and an anode which are immersed in an aqueous resinous dispersion containing an aqueous resinous composition wherein the improvement comprises a polymer characterized by a pendant group which is of the structure:

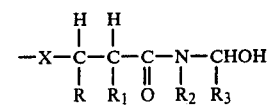

wherein X represents sulfur or an amino group

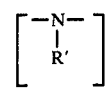

of which R′ is hydrogen or an alkyl group containing from about 1 to 6 carbon atoms; and wherein R, $R_1$, $R_2$ and $R_3$, each independently, is hydrogen or an alkyl group containing from about 1 to 6 carbon atoms; said composition also comprises a water-solubilizing group.

2. A process of claim 1 wherein the aqueous resinous composition is of a pH of about 4 or greater.

3. A process of claim 1 wherein the alkyl groups contain from about 1 to about 4 carbon atoms.

4. A process of claim 3 wherein R', R, $R_1$, $R_2$ and $R_3$, each independently, is a hydrogen or methyl.

5. A process of claim 1 wherein the polymer is derived from a polymer containing a pendant mercapto group, and/or a pendant amino group which is a primary and/or a secondary amine, or a mixture thereof.

6. In an improved process for cathodically electrocoating an electrically conductive surface serving as a cathode which comprises passing an electric current between said cathode and an anode which are immersed in an aqueous resinous dispersion comprising an aqueous resinous composition wherein the improvement comprises said composition is prepared by reacting a polymer containing a pendant mercapto group, and/or a pendant amino group which is a primary and/or secondary amine, or a mixture thereof, in aqueous medium with an N-methylol ethylenically unsaturated amide of the structure:

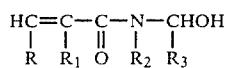

wherein R, $R_1$, $R_2$ and $R_3$, each independently, is hydrogen or an alkyl group containing from about 1 to 6 carbon atoms.

7. A process of claim 6 wherein the alkyl groups contain from about 1 to 4 carbon atoms.

8. A process of claim 7 wherein the R, $R_1$, $R_2$ and $R_3$, each independently, is a hydrogen or methyl.

9. A process of claim 6 wherein the polymer is derived from a polymer containing a pendant mercapto group, and/or a pendant amino group which is a primary and/or a secondary amine, or a mixture thereof.

10. A process of claim 6 wherein the polymer containing the pendant amino group is selected from the group consisting of poly(amide-amine) resins, amino group-containing acrylic polymers and polyepoxide-amine adducts.

11. A process of claim 10 wherein the polymer is a polyepoxide-amine adduct.

12. A process of claim 11 wherein the amine is a ketimine of poly(alkyleneamine).

13. A process of claim 1 or 6 which comprises N-methylol amide groups in an amount sufficient to provide self-curing properties.

14. A process of claim 13 which comprises from about 1 to 20 percent of N-methylol groups.

15. A process of claim 14 which comprises from about 5 to 20 percent by weight of N-methylol groups.

* * * * *